United States Patent [19]

Gray

[11] Patent Number: 5,071,087
[45] Date of Patent: Dec. 10, 1991

[54] METHOD OF GUIDING AN IN-FLIGHT VEHICLE TO A DESIRED FLIGHT PATH

[75] Inventor: Roger L. Gray, King George, Va.

[73] Assignee: The United States of America as represented by the Secretary of the Navy, Washington, D.C.

[21] Appl. No.: 708,991

[22] Filed: Mar. 11, 1991

[51] Int. Cl.$^5$ .......................... F41G 7/22; F42B 10/66
[52] U.S. Cl. .................................. 244/3.15; 244/3.22
[58] Field of Search ..................... 244/3.15, 3.16, 3.19, 244/3.22

[56] References Cited

U.S. PATENT DOCUMENTS

| | | | |
|---|---|---|---|
| 2,415,348 | 2/1947 | Haigney | 102/50 |
| 2,992,423 | 7/1961 | Floyd et al. | 244/3.15 |
| 3,141,635 | 2/1964 | Davis et al. | 244/14 |
| 3,374,967 | 3/1968 | Plumley | 244/3.14 |
| 3,603,531 | 9/1971 | Brucker-Strinkuhl | 244/3.16 |
| 3,843,076 | 10/1974 | King et al. | 244/3.16 |
| 3,964,695 | 6/1976 | Harris | 244/3.16 |
| 4,300,736 | 11/1981 | Miles | 244/3.13 |
| 4,347,996 | 9/1982 | Grosso | 244/3.16 |
| 4,898,340 | 2/1990 | Kliger et al. | 244/3.11 |

OTHER PUBLICATIONS

Navy Case 72853, Roger L. Gray, Patent Application dated 2/08/91.
Navy Case 72836, S/N 7/620,671, Roger L. Gray, Patent Application.

*Primary Examiner*—Charles T. Jordan
*Attorney, Agent, or Firm*—John D. Lewis; Kenneth E. Walden

[57] ABSTRACT

A method of using two diverts in combination to guide an in-flight vehicle from its initial flight path at target acquisition to a desired flight path prior to target interception is provided. The two diverts are of known and different magnitudes. The magnitude of an initial projected miss at a closest approach to the target is used to determine the order and timing of the two diverts. At the completion of the second divert, the vehicle is on the desired flight path which may be either a collision or offset course trajectory as required by the vehicle's terminal guidance law.

5 Claims, 1 Drawing Sheet

METHOD OF GUIDING AN IN-FLIGHT VEHICLE TO A DESIRED FLIGHT PATH

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to guidance techniques and more particularly to a method of guiding an in-flight vehicle from its initial flight path at target acquisition to a desired flight path prior to target interception.

BACKGROUND OF THE INVENTION

Due to velocity and position errors, an in-flight vehicle may not be on the desired flight path relative to a target when its sensor first acquires the target. For instance, when the vehicle's sensor acquires the target, the target may not be in the predicted position. The vehicle must then determine the trajectory of the target and must determine the correct intercept flight path. Accordingly, a maneuver is typically required to guide the vehicle from its initial flight path at target acquisition to the flight path required by the vehicle's terminal guidance law. Generally, a large initial course correction is required regardless of the choice of vehicle or guidance law.

Depending on the application, several techniques currently exist for in-flight adjustment of a vehicle's flight path. For example, if the vehicle is within the earth's atmosphere, various control surfaces can be used to turn the vehicle. However, if the vehicle must travel beyond the earth's atmosphere, the vehicle must be equipped with divert motors. If the vehicle is equipped with liquid fuel divert motors, flight path changes can be affected by properly setting the velocity impulses of the divert motor. However, if the vehicle is equipped with solid fuel divert motors, the fixed magnitude burns achieved by the solid fuel motors must be properly scheduled and directed to make the large initial course corrections that place the vehicle on the desired flight path. In either case, it is desirable to minimize the number of divert motors and maneuvers necessary to achieve the desired flight path in order to simplify vehicle design.

SUMMARY OF THE INVENTION

Accordingly, it is an object of the present invention to provide a method of guiding an in-flight vehicle from its initial flight path at target acquisition to a desired flight path prior to target interception.

Another object of the present invention is to provide a method of achieving large initial course corrections if the vehicle is equipped with solid or liquid fuel divert motors.

Still another object of the present invention is to provide a method that minimizes the number of divert motors and maneuvers necessary to achieve the desired flight path in order to simplify design of the vehicle.

Other objects and advantages of the present invention will become more obvious hereinafter in the specification and drawings.

In accordance with the present invention, a method is provided that uses two diverts to guide an in-flight vehicle from its initial flight path at target acquisition to a desired flight path prior to target interception. For purposes of the present invention, the vehicle is equipped with the capability of achieving two diverts from its initial flight path. Each divert is capable of imparting a velocity impulse of known magnitude such that one is of smaller magnitude than the other. The magnitude and direction of the projected miss are developed after target acquisition. The projected miss is a closest approach distance between the vehicle and target when the vehicle is projected on a free fall trajectory. Each divert is scheduled and directed, based on the projected miss, such that the combined effect of the diverts places the vehicle on the desired flight path. The desired flight path achieved may be one of either a collision course or an offset course trajectory.

DETAILED DESCRIPTION OF THE INVENTION

Figure 1:
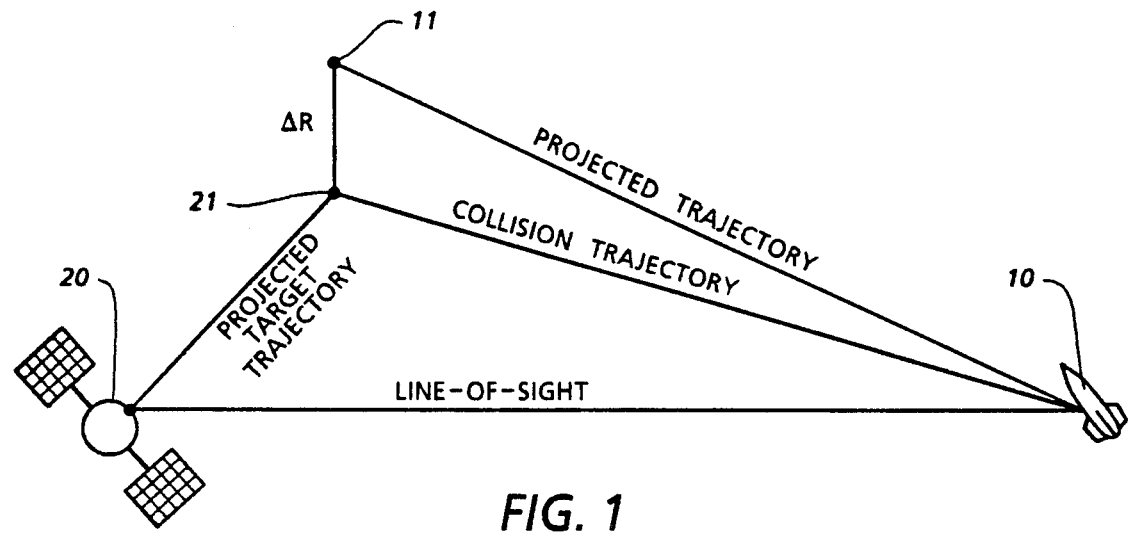
FIG. 1 is a diagrammatic view showing the geometrical relationships formed at the time of target acquisition according to the method of the present invention.

Referring now to the drawings, and in particular to FIG. 1, the geometrical relationships formed at the time of target acquisition are shown. Generally speaking, target acquisition occurs when an in-flight vehicle 10 detects the presence of a target 20. Typically, this is accomplished by means of sensor (not shown) mounted on vehicle 10. By way of example only, vehicle 10 is a missile and target 20 is a satellite. However, vehicle 10 may be any in-flight vehicle enroute to an interception, docking, etc., with target 20. The sensor used may range from a simple optical sensor to a complex multiple radar system and is not a constraint on the present invention.

Once acquired, a LINE-OF-SIGHT exists between vehicle 10 and target 20. Based on prior knowledge of target 20 and current sensor measurements, a PROJECTED TARGET TRAJECTORY is developed. Similarly, current velocity and position knowledge about vehicle 10 is used to develop both a COLLISION TRAJECTORY and PROJECTED TRAJECTORY. The PROJECTED TRAJECTORY is a free fall (vehicle is not thrusting) trajectory. From these three trajectories, it is possible to predict both a projected target position 21 and a projected vehicle position 11 at a closest approach. The distance between positions 11 and 21 is the projected miss at a closest approach. As will be explained further hereinbelow, the projected miss is a vector quantity $\Delta R$, having magnitude and direction. The determination of the aforementioned trajectories, and hence the determination of the projected miss $\Delta R$, is well known in the art. Accordingly, the method of the present invention assumes that the projected miss $\Delta R$ is provided thereto.

The method of the present invention uses the combined effect of two diverts to guide vehicle 10 from its initial flight path to the flight path required by the vehicle's terminal guidance law. For purposes of the present invention, the initial flight path is the flight path of vehicle 10 at the time of target acquisition. The two diverts are scheduled and directed in such a way that their combined effect modifies the projected miss $\Delta R$ provided at target acquisition. The magnitude of each divert (i.e. the amount it modifies the projected miss) is equal to the velocity impulse imparted by the divert times the time-to-go between the midpoint of the divert and target interception (or a closest approach to the target). The amount of modification of the projected miss is a function of the requirements of the vehicle's terminal guidance law. Accordingly, the method can be utilized in conjunction with terminal guidance laws that require the vehicle to be on either a collision course or on an offset course trajectory. While the following description assumes for simplicity that vehicle 10 is to be placed on a collision course at the completion of the two diverts, the present invention is not so limited. Indeed, the methodology used to place vehicle 10 on an offset course trajectory is discussed at the end of the description.

For effective application of the present method, the two diverts should exhibit the following characteristics. First, the two diverts (denoted A and B) should impart different velocity impulses. The velocity impulse magnitudes associated with diverts A and B are denoted $\Delta V_A$ and $\Delta V_B$, respectively, where $\Delta V_B \geq \Delta V_A$. While not a requirement of the present invention, $\Delta V_B$ is usually significantly larger the $\Delta V_A$. Nominally, the velocity impulse of $\Delta V_B$ is four or five times that of $\Delta V_A$. This allows the second divert to occur relatively close to target interception thereby minimizing the amount of flight time and maneuvering that the terminal guidance law is required to handle. A second characteristic exhibited by diverts A and B is that the magnitudes $\Delta V_A$ and $\Delta V_B$ should be known. This is necessary for both solid and liquid fuel divert motors. Finally, the burn order of diverts A and B should be selectable in flight such that either divert A or B could be burned first. However, it should be noted that there may be certain applications that permit a fixed burn order between diverts A and B such that selectability is not necessary. For instance, if it is known that the initial course correction performed by the present method would always be relatively small, a fixed burn order starting with $\Delta V_A$ could be scheduled.

The maneuvering of the vehicle brought about by the method of the present invention can be subdivided into a series of two coasts, each of which is followed by a divert. During the coasts, the vehicle exhibits free fall. During the diverts, the divert motor(s) of the vehicle are thrusting. The series of coasts and diverts, and associated operations, are outlined below.

1) The Initial Coast

It is assumed that the vehicle is coasting when its sensor acquires the target. The vehicle continues to coast for a period of time while sensor measurements are being processed to determine the projected miss $\Delta R$ as explained above. The selection, timing and direction of the first divert are then determined based on the magnitude and direction of the projected miss $\Delta R$.

2) The First Divert

Either divert A or divert B is selected as the first divert depending on the magnitude $|\Delta R|$ of the projected miss $\Delta R$. The first divert is generally burned at a time given by a specified nominal time $T_{NOM1}$. $T_{NOM1}$ is specified prior to target acquisition and is not a function of intercept geometry. $T_{NOM1}$ is defined as the time-to-go between the midpoint of the first divert and target interception (or a closest approach to the target). Note that a certain range of $|\Delta R|$ requires the postponement or delay of the first divert by a delay factor P which will be explained later in the discussion. For all other ranges of $|\Delta R|$, up to a magnitude limit, the delay factor P is equal to 1.

Although not a constraint on the present method, the first divert is generally applied approximately perpendicular to the LINE-OF-SIGHT, while its direction about the LINE-OF-SIGHT is dictated by the requirements of the maneuver. In this way, the vehicle's sensor (assumed to be positioned perpendicular to the divert motor(s)) does not have to look away from the target during the first divert. Accordingly, the sensor does not have to reacquire the target after the first divert.

3) The Second Coast

During the second coast, the vehicle continues to process sensor measurements to fine tune its estimates of target and vehicle trajectories used to determine the direction of the second divert. Preferably, the vehicle remains in the second coast for a relatively long period of time in order to be relatively close to the target at the completion of the second divert. Typically, this is more than half the time between target acquisition and target interception although the actual amount of time depends on the application.

4) The Second Divert

The second divert moves the vehicle onto the desired flight path (collision or offset course trajectory) required by the vehicle's terminal guidance law. Either divert A or divert B, whichever remains available to the vehicle after the first divert, is used for the second divert. The second divert is burned at a specified nominal time $T_{NOM2}$ where $T_{NOM2}$ is defined as the nominal time-to-go between the midpoint of the second divert and target interception (or a closest approach to the target). $T_{NOM2}$ is specified prior to target acquisition and is not a function of intercept geometry. The second divert is also preferably applied approximately perpendicular to the LINE-OF-SIGHT. The completion of the second divert marks the end of the maneuver governed by the present invention. From this point on, the vehicle's terminal guidance law guides the vehicle to the target.

As mentioned above, the order and timing of diverts A and B are determined by the magnitude $|\Delta R|$ present when the target is acquired by the vehicle's sensor, and are summarized by the logic in TABLE 1 below.

TABLE 1

| If: | First Divert and Timing | Second Divert and Timing |
|---|---|---|
| $|\Delta R| \leq MAG_1$ | A at $T_{NOM1}*P$, P = 1 | B at $T_{NOM2}$ |
| $MAG_1 < |\Delta R| < MAG_2$ | B at $T_{NOM1}*P$, P < 1 | A at $T_{NOM2}$ |
| $MAG_2 \leq |\Delta R| \leq MAG_3$ | B at $T_{NOM1}*P$, P = 1 | A at $T_{NOM2}$ |

Note that there is one case not listed in TABLE 1, namely, $MAG_3 < |\Delta R|$. If this occurs, the projected miss is larger than the vehicle is designed to handle. However, the vehicle may still be able to achieve the desired flight path by burning divert B first, prior to the nominal time $T_{NOM1}$ (i.e. P > 1), in order to achieve a greater net effect from the divert. Other factors contributing to the success or failure of such a case include the time of acquisition and the size of $|\Delta R|$.

The parameters $MAG_1$, $MAG_2$, $MAG_3$, $T_{NOM1}$ and $T_{NOM2}$ are related to the known magnitude $\Delta V_A$ and $\Delta V_B$ of diverts A and B. The relationship between $T_{NOM1}$ and $T_{NOM2}$ is dictated by the demands placed on the maneuver if the vehicle is on a collision course at target acquisition. Recalling that the vehicle must be back on a collision course after the maneuver, the second divert must exactly offset the effect of the first divert on the projected miss. The effect of each divert can be expressed as the product of the velocity impulse and the time-to-go associated with the divert since both diverts are directed perpendicular to the LINE-OF-SIGHT. Consequently, the relationship between the first and second diverts can be expressed as:

$$T_{ACTUAL1} * \Delta V_1 = T_{ACTUAL2} * \Delta V_2 \tag{1}$$

Where $\Delta V_i$ and $T_{ACTUALi}$ represent the velocity impulse and actual time-to-go from the midpoint of the i-th divert to target interception (or target closest approach). Since $T_{ACTUAL2}$ is, by definition, less than $T_{ACTUAL1}$, the smaller divert A must be utilized first. Consequently, $\Delta V_1$ and $\Delta V_2$ may be replaced by $\Delta V_A$ and $\Delta V_B$, and $T_{ACTUAL2}$ can be expressed as:

$$T_{ACTUAL2} = T_{ACTUAL1} * (\Delta V_A / \Delta V_B) \tag{2}$$

Either the two nominal times $T_{NOM1}$ and $T_{NOM2}$ are selected to accommodate this scenario, or the actual burn times $T_{ACTUAL1}$ and $T_{ACTUAL2}$ are allowed to vary from the nominal times if the vehicle is initially on a collision course. Both are embodiments of the present invention. However, for mathematical simplicity, it is assumed that:

$$T_{NOM2} = T_{NOM1} * (\Delta V_A / \Delta V_B) \tag{3}$$

for the remainder of the description.

The values of $MAG_1$, $MAG_2$, and $MAG_3$ are related to the known magnitudes $\Delta V_A$ and $\Delta V_B$ of diverts A and B. The relationships are derived by examining the divert capabilities associated with two scenarios, namely, 1) selecting small divert A as the first divert and 2) selecting large divert B as the first divert.

Scenario 1: Selecting small divert A for the first divert

If small divert A must be selected as the first divert, large divert B must be able to completely null the projected miss remaining in the trajectory after the first divert. For this to be possible, the projected miss during the second coast period must be equal to $T_{NOM2} * \Delta V_B$. The first divert is capable of creating such a (second coast) projected miss if the projected miss at target acquisition falls between $|T_{NOM2} * \Delta V_B - T_{NOM1} * \Delta V_A|$ and $|T_{NOM2} * \Delta V_B + T_{NOM1} * \Delta V_A|$. Any magnitude $|\Delta R|$ within this range can be nulled by appropriately scheduling and directing the A and B diverts.

Figure 2:
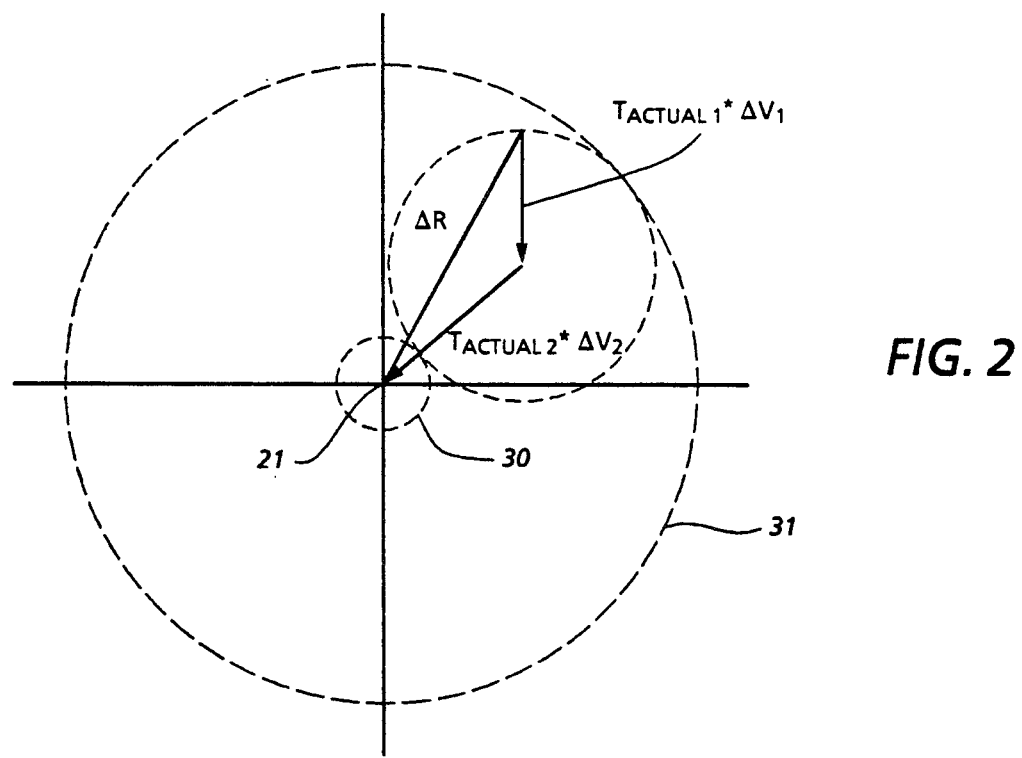
FIG. 2 is a diagrammatic view of the plane perpendicular to the line-of-sight to the target geometrically showing how the initial projected miss is nulled according to the method of the present invention.

This capability is geometrically depicted in FIG. 2 where the plane shown is perpendicular to the LINE-OF-SIGHT. The origin of the plane is at the projected collision point 21 with the target. In this scenario, the minimum projected miss boundary circle 30 represents the boundary condition $|T_{NOM2} * \Delta V_B - T_{NOM1} * \Delta V_A|$ while the maximum projected miss boundary circle 31 represents the boundary condition $|T_{NOM2} * \Delta V_B + T_{NOM1} * \Delta V_A|$. Each divert moves the location that the vehicle intercepts this plane by an amount equal to $T_{ACTUALi} * \Delta V_i$. Thus, by properly directing the two diverts as shown, any initial projected miss between boundary circles 30 and 31 can be nulled.

Using the relationship from equation (3), the range for $MAG_1$ simplifies to:

$$0 \leq |\Delta R| \leq (T_{NOM2} * \Delta V_B + T_{NOM1} * \Delta V_A) = 2 * T_{NOM1} * \Delta V_A \tag{4}$$

Consequently, $$MAG_1 = 2 * T_{NOM1} * \Delta V_A \tag{5}$$

Scenario 2: Selecting large divert B for the first divert

If large divert B must be selected as the first divert, the approach to determine the values of $MAG_2$ and $MAG_3$ is the same as that used in Scenario 1. If the two diverts are burned at their nominal times $T_{NOM1}$ and $T_{NOM2}$, the range of $|\Delta R|$ which can be nulled if divert B is burned first is:

$$(T_{NOM1} * \Delta V_B - T_{NOM2} * \Delta V_A) \leq |\Delta R| \leq (T_{NOM1} * \Delta V_B + T_{NOM2} * \Delta V_A) \tag{6}$$

Using the relationship from equation (3) simplifies the range to:

$$T_{NOM1} * (\Delta V_B - \Delta V_A^2 / \Delta V_B) \leq |\Delta R| \leq T_{NOM1} * (\Delta V_B + \Delta V_A^2 / \Delta V_B) \tag{7}$$

Consequently, $$MAG_2 = T_{NOM1} * (\Delta V_B - \Delta V_A^2 / \Delta V_B) \tag{8}$$

$$MAG_3 = T_{NOM1} * (\Delta V_B + \Delta V_A^2 / \Delta V_B) \tag{9}$$

The range associated with these two scenarios can easily be compared if $\Delta V_A$ is expressed as:

$$\Delta V_B = N * \Delta V_A \tag{10}$$

Then, the ranges can be written:
Scenario 1:

$$0 \leq |\Delta R| \leq 2 * T_{NOM1} * \Delta V_A \tag{11}$$

Scenario 2:

$$(N - 1/N) * T_{NOM1} * \Delta V_A \leq |\Delta R| \leq (N + 1/N) * T_{NOM1} * \Delta V_A \tag{12}$$

From equations (10), (11) and (12), it is readily apparent that the maximum value of $|\Delta R|$ is $(N + 1/N) * T_{NOM1} * \Delta V_A$ or $T_{NOM1} * (\Delta V_B + \Delta V_A^2 / \Delta V_B)$. Thus diverts A and B must be sized such that the divert capability of the vehicle can null the maximum $|\Delta R|$.

In addition, a gap or a "crack" in the range between Scenario 1 ($MAG_1$) and Scenario 2 ($MAG_2$) will develop if:

$$(N - 1/N) \geq 2 \tag{13}$$

or whenever $N \geq$ approximately 2.414. This means that the magnitude $|\Delta R|$ of the initial projected miss is too large to be nulled using small divert A first and yet, too small to be nulled using large divert B first. Accordingly, the first divert must be the large divert B delayed by the aforementioned delay factor P when $MAG_1 < |\Delta R| < MAG_2$ (see TABLE 1). The minimum initial projected miss from Scenario 2 (equation (6)) thus becomes:

$$(P \cdot T_{NOM1} \cdot \Delta V_B - T_{NOM2} \cdot \Delta V_A) \tag{14}$$

which, using the relationships from equations (3) and (10), simplifies to:

$$(P \cdot N - 1/N) \cdot T_{NOM1} \cdot \Delta V_A \tag{15}$$

Furthermore, the magnitude $|\Delta R|$ of the initial projected miss may be expressed as:

$$|\Delta R| = A \cdot T_{NOM1} \cdot \Delta V_A \tag{16}$$

where $2 < A \leq (N - 1/N)$ for $MAG_1 < |\Delta R| < MAG_2$. According to equation (15), the magnitude $|\Delta R|$ can be nulled if:

$$A = P \cdot N - 1/N \tag{17}$$

Combining equations (16) and (17), the delay factor P for this case may be expressed as:

$$|\Delta R|/(N \cdot T_{NOM1} \cdot \Delta V_A) + 1/N^2 \tag{18}$$

As mentioned above, it is preferable to burn the second divert long after the first divert. Thus, it is necessary to examine the worst case scenario, i.e. when the first divert must be postponed by its greatest amount. This worst case develops when A equals 2 in equation (17) such that:

$$P = (2 + 1/N)/N \tag{19}$$

The time-to-go associated with the first divert then becomes:

$$P \cdot T_{NOM1} = T_{NOM1} \cdot (2 + 1/N)/N \tag{20}$$

Substituting for $T_{NOM1}$ using equations (3) and (10), the time-to-go associated with the first divert becomes:

$$(2 + 1/N) \cdot T_{NOM2} \tag{21}$$

Thus, even in this worst case scenario, the time-to-go associated with the first divert is still more than twice the time-to-go associated with the second divert.

Directing the diverts is merely geometry and is not representative of the novel features of the present invention. Referring again to FIG. 2, since the initial projected miss ($\Delta R$), the time-to-go with each divert ($T_{ACTUAL1}$ and $T_{ACTUAL2}$) and the velocity impulses associated with each divert ($\Delta V_1$ and $\Delta V_2$) are all known, all three sides of the triangle are known. Using the trigonometric law of cosines, all angles associated with the triangle can be determined as is well-known in the art. These angles, in conjunction with the direction of the initial projected miss $\Delta R$, can be used to determine the fire direction of the diverts.

The foregoing discussion has assumed that the maneuvers determined by the present method will place the vehicle on a collision course trajectory at the completion of the second divert. In vector notation, this reduces to:

$$\Delta R + T_{ACTUAL1} \cdot \Delta V_1 + T_{ACTUAL2} \cdot \Delta V_2 = 0 \tag{21}$$

However, the maneuver defined by the present method can still be applied if the vehicle's terminal guidance law requires the vehicle flight path (following the second divert) to be offset from the collision course trajectory. One such guidance law is defined in applicant's application, Ser. No. 620,671 filed Dec. 3, 1990.

If an offset course trajectory is required, the maneuver requires only one modification. The direction of the second divert must be adjusted such that an intentional projected miss exists after the second divert. A method of achieving the intentional projected miss is provided by applicant in the aforementioned recently filed application. The intentional projected miss can be anywhere on a circle about the collision point. The circle lies in the plane perpendicular to the LINE-OF-SIGHT. In vector notation, this reduces to:

$$\Delta R + T_{ACTUAL1} \cdot \Delta V_1 + T_{ACTUAL2} \cdot \Delta V_2 \neq 0 \tag{22}$$

The advantages of the present invention are numerous. Although variable impulse divert motors can be used to achieve the specified diverts, the method only requires two simple fixed magnitude divert motors. Consequently, solid fuel divert motors can be used as well as liquid fuel divert motors. However, relative to liquid fuel motors, solid fuel motors are safe, simple and inexpensive. Thus, solid fuel motors are more desirable, even if they are not necessary for safety requirements.

The method of the present invention does not require the vehicle's sensor to look away from the target during a divert thereby alleviating the problem of reacquisition after a divert. Furthermore, by not having to look away from the target, the requirements placed on the vehicle's attitude control thrusters are minimized. This is because the vehicle's moment of inertia is likely to be largest about the axes perpendicular to the LINE-OF-SIGHT.

The second divert is scheduled at a predetermined time relatively close to target interception. Accordingly, the flight time remaining after the maneuver governed by the present invention is held to a minimum. On completion of the maneuver, the vehicle is on the desired flight path. At this point, small diverts must be applied to maintain the desired flight path regardless of the choice of guidance law. Therefore, by minimizing the remaining flight time, the number of diverts controlled by the vehicle's guidance law is minimized. This simplifies and reduces the cost of the vehicle.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. In a tracking system operable from the time of target acquisition, a method of using two divert motor burns in combination to guide an in-flight vehicle to a desired flight path prior to target interception, each of the divert motor burns having velocity impulses of $\Delta V_1$ and $\Delta V_2$, respectively, such that $\Delta V_1 \neq \Delta V_2$, comprising the steps of:

providing, after target acquisition, the magnitude and direction of a projected miss $\Delta R$, wherein the projected miss $\Delta R$ is a closest approach distance between the vehicle and target when the vehicle is projected on a free fall trajectory; and firing each of the two divert motors at times $T_{ACTUAL1}$ and $T_{ACTUAL2}$ indicative of the time between the midpoint of the respective divert motor burn and the closest approach to the target wherein the desired flight path achieved may be either a collision course trajectory if $$\Delta R + T_{ACTUAL1} * \Delta V_1 + T_{ACTUAL2} * \Delta V_2 = 0$$

or an offset course trajectory if $$\Delta R + T_{ACTUAL1} * \Delta V_1 + T_{ACTUAL2} * \Delta V_2 \neq 0.$$

2. A method as in claim 1 further including the step of selecting the velocity impulse $\Delta V_1$ of the first divert motor burn to be greater or less than the velocity impulse $\Delta V_2$ of the second divert motor burn based on the magnitude of the projected miss $\Delta R$.

3. A method as in claim 1 wherein each of the two divert motor burns is fired approximately perpendicular to a target line-of-sight.

4. A method of using two diverts to guide an in-flight vehicle from its initial flight path at target acquisition to a desired flight path prior to target interception, comprising the steps of:

providing the in-flight vehicle with the capability of achieving two diverts from the initial flight path wherein the velocity impulse $\Delta V_A$ associated with one divert is less than the velocity impulse $\Delta V_B$ associated with the other divert;

providing, after target acquisition, the magnitude and direction of a projected miss $\Delta R$, wherein the projected miss $\Delta R$ is a closest approach distance between the vehicle and target when the vehicle is projected on a free fall trajectory;

selecting a first divert velocity impulse $\Delta V_1$ from the two velocity impulses $\Delta V_A$ and $\Delta V_B$ based upon the magnitude of the projected miss $\Delta R$;

diverting the vehicle for a first time by an amount equal to $$\Delta V_1 * T_{NOM1} * P$$

where $T_{NOM1}$ is a specified nominal time-to-go between the midpoint of the first divert and the closest approach to the target and P is a delay factor; and diverting the vehicle for a second time after the first divert by an amount equal to $$\Delta V_2 * T_{NOM2}$$

where the second divert velocity impulse $\Delta V_2$ is the velocity impulse $\Delta V_A$ or $\Delta V_B$ remaining available to the vehicle after the first divert is complete and where $T_{NOM2}$ is a specified nominal time-to-go between the midpoint of the second divert and the closest approach to the target wherein each of the two diverts is imparted approximately perpendicular to a target line-of-sight and wherein the direction of the first and second diverts is determined geometrically from $T_{NOM1}$, $T_{NOM2}$, $\Delta V_A$, $\Delta V_B$ and the direction of the projected miss $\Delta R$ such that the desired flight path achieved may be either a collision course trajectory or an offset course trajectory.

5. A method as in claim 4 wherein $|\Delta R|$ is the magnitude of the projected miss $\Delta R$ and wherein the values of velocity impulses $\Delta V_A$ and $\Delta V_B$ are known and the first divert velocity impulse $\Delta V_1$ is selected to equal:

i) $\Delta V_A$ if $|\Delta R| \leq 2*T_{NOM1}*\Delta V_A$, wherein the delay factor P=1, ii) $\Delta V_B$ if $2*T_{NOM1}*\Delta V_A < |\Delta R| < T_{NOM1}*(\Delta V_B - \Delta V_A^2/\Delta V_B)$, wherein the delay factor $P=|\Delta R|/(N*T_{NOM1}*\Delta V_A)+1/N^2$ where $N=\Delta V_B/\Delta V_A$, or iii) $\Delta V_B$ if $T_{NOM1}*(\Delta V_B - \Delta V_A^2/\Delta V_B) \leq |\Delta R| \leq T_{NOM1}*(\Delta V_B + \Delta V^{A2}/\Delta V_B)$, wherein the delay factor P=1.

* * * * *